US011255391B2

(12) United States Patent
Qian

(10) Patent No.: US 11,255,391 B2
(45) Date of Patent: Feb. 22, 2022

(54) QUICK RELEASE DEVICE OF BRAKE CYLINDER

(71) Applicant: Shuhui Qian, Ningbo (CN)

(72) Inventor: Shuhui Qian, Ningbo (CN)

( * ) Notice: Subject to any disclaimer, the term of this patent is extended or adjusted under 35 U.S.C. 154(b) by 53 days.

(21) Appl. No.: 16/827,184

(22) Filed: Mar. 23, 2020

(65) Prior Publication Data
US 2021/0293290 A1    Sep. 23, 2021

(51) Int. Cl.
*B25B 27/00* (2006.01)
*F16D 65/00* (2006.01)

(52) U.S. Cl.
CPC ...... *F16D 65/0043* (2013.01); *B25B 27/0035* (2013.01)

(58) Field of Classification Search
CPC ............. F16D 65/0043; B25B 27/0035; B25B 27/0021; Y10T 29/53796
USPC ......................................................... 29/256
See application file for complete search history.

(56) References Cited

U.S. PATENT DOCUMENTS

| 6,614,337 | B1 * | 9/2003 | Winnard | B25B 11/002 |
| | | | | 206/350 |
| 8,826,504 | B1 * | 9/2014 | Slivon | B25B 27/0035 |
| | | | | 29/239 |
| 10,156,273 | B1 * | 12/2018 | Huang | F16D 65/0043 |
| 10,371,220 | B2 * | 8/2019 | Wu | B25B 13/463 |
| 2004/0244543 | A1 * | 12/2004 | Barnett | B25B 23/0035 |
| | | | | 81/62 |
| 2013/0213191 | A1 * | 8/2013 | Harvey | B25B 13/48 |
| | | | | 81/125 |
| 2018/0335097 | A1 * | 11/2018 | Dahl | B25B 27/0035 |
| 2019/0076997 | A1 * | 3/2019 | Hernandez, Jr. | B25B 27/0035 |

* cited by examiner

*Primary Examiner* — Lee D Wilson
(74) *Attorney, Agent, or Firm* — Pro-Techtor International Services; Ian Oglesby

(57) ABSTRACT

A quick release device of a brake cylinder includes: a first support iron plate; a second support iron plate installed with an interval from a side of the first support iron plate; an iron plate ejector, installed between the first and second support iron plates, for expanding the relative distance between the first and second support iron plates; a wrench assembly, sheathed on the iron plate ejector in a quick release status; and at least one quick release portion, installed at a relative position of the iron plate ejector and the second support iron plate, so that the second support iron plate is in a quick release status.

1 Claim, 3 Drawing Sheets

QUICK RELEASE DEVICE OF BRAKE CYLINDER

FIELD OF INVENTION

The present invention relates to the field of vehicle repair tools, in particular to a quick release device of a brake cylinder.

BACKGROUND OF INVENTION

1. Description of the Related Art

Brake cylinder is a brake component in the vehicle brake system and its main function is to push a brake pad to rub with a brake drum in order to reduce the speed of a motor vehicle or stop the motor vehicle. The brake cylinder refers to a friction material fixed onto a brake drum or a brake disc that rotates on a wheel, wherein a friction lining and a friction pad withstand an external pressure to produce friction to achieve the purpose of decelerating the motor vehicle. For the motor vehicles, the brake cylinder acting as an important part of car components must be checked and maintained frequently. When it is necessary to replace the brake pad, one must remove the brake cylinder before replacing the brake pad. However, the present existing brake cylinder generally requires hammering onto the brake cylinder manually to open the internal structure for removal and installation, and there may be an issue of jumping or slipping occurred during the hammering process. Obviously, the application is very inconvenient.

Although the disassembling device of a conventional brake assembly can achieve the basic disassembling purpose, the device has the disadvantages of overly complicated structure and high manufacturing cost. In addition, the operation of the conventional device often carried out by rotating a threaded rod for stretching and resetting is laborious and inconvenient. Obviously, the conventional disassembling device still requires further improvements.

2. Summary of the Invention

Therefore, it is a primary objective of the present invention to overcome the aforementioned drawbacks of the conventional disassembling device by providing a quick release device of a brake cylinder. To achieve this objective, the present invention provides a quick release device of a brake cylinder comprising: a first support iron plate; a second support iron plate, installed with an interval from a side of the first support iron plate; an iron plate ejector, installed between the first and second support iron plates, for expanding the relative distance between the first and second support iron plates; a wrench assembly, sheathed on the iron plate ejector in a quick release status; and at least one quick release portion, installed at a relative position of the iron plate ejector and the second support iron plate, so that the second support iron plate is in a quick release status.

Another objective of the present invention is to design a first end surface and a second end surface on the iron plate ejector, wherein a telescopic structure is disposed between the first end surface and the first support iron plate, and the second end surface is fixedly coupled to the second support iron plate. When use, the telescopic structure is stretched to a length equal to the distance between the first support iron plate and the iron plate ejector, and the second support iron plate is fixed onto the second end surface. If the distance between the first support iron plate and the iron plate ejector increases, the distance between the second support iron plate and the first support iron plate will also increase accordingly, so as to complete the operation simply and quickly.

Another objective of the present invention is to design a telescopic structure comprised of a threaded hole structure disposed at the first end surface and a stud structure disposed at a relative position of the first support iron plate and the threaded hole structure. By rotating the stud structure and threaded hole structure, the distance between the first support iron plate and the iron plate ejector can be adjusted, and the second support iron plate and the iron plate ejector are fixed, so that the increase of distance between the first support iron plate and the second support iron plate can be used to achieve the effect of ejecting the brake cylinder for removal.

Another objective of the present invention is to design a quick release portion comprised of a magnetic steel disposed at the second end surface and a magnetic guide portion disposed at a relative position of the second support iron plate and the magnetic steel, so that the two can be detached easily after use, so as to achieve the quick release purpose and the effect of changing a wrench assembly of a different size.

Another objective of the present invention is to design a magnetic guide portion in form of a guide slot, so that the magnetic steel and the magnetic guide portion can be embedded with each other in a foolproof magnetic attraction manner, so as to achieve a quick and stable assembling effect.

DESCRIPTION OF THE PREFERRED EMBODIMENTS

Figure 1:
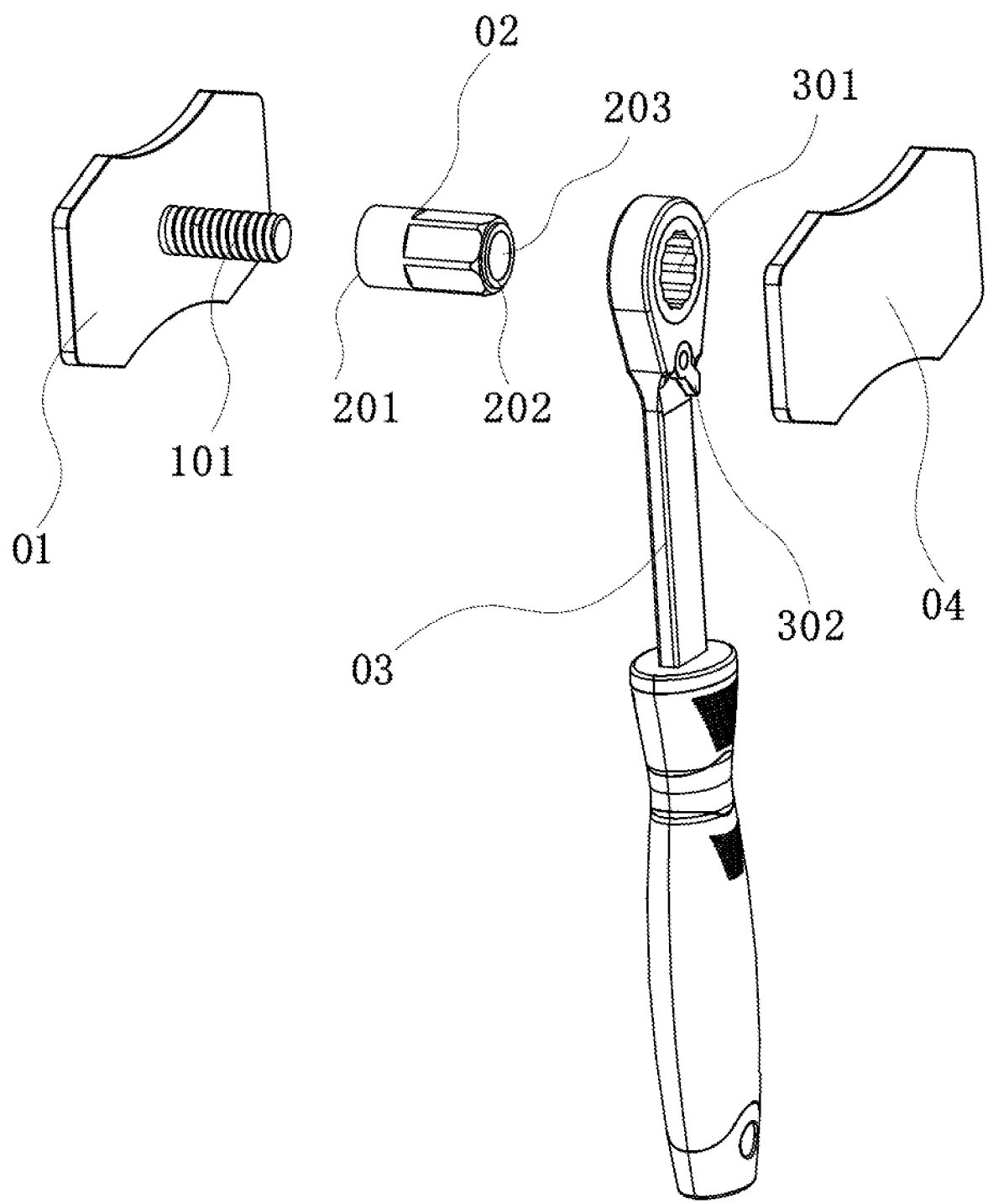
FIG. 1 is an exploded view of the present invention.
Figure 2:
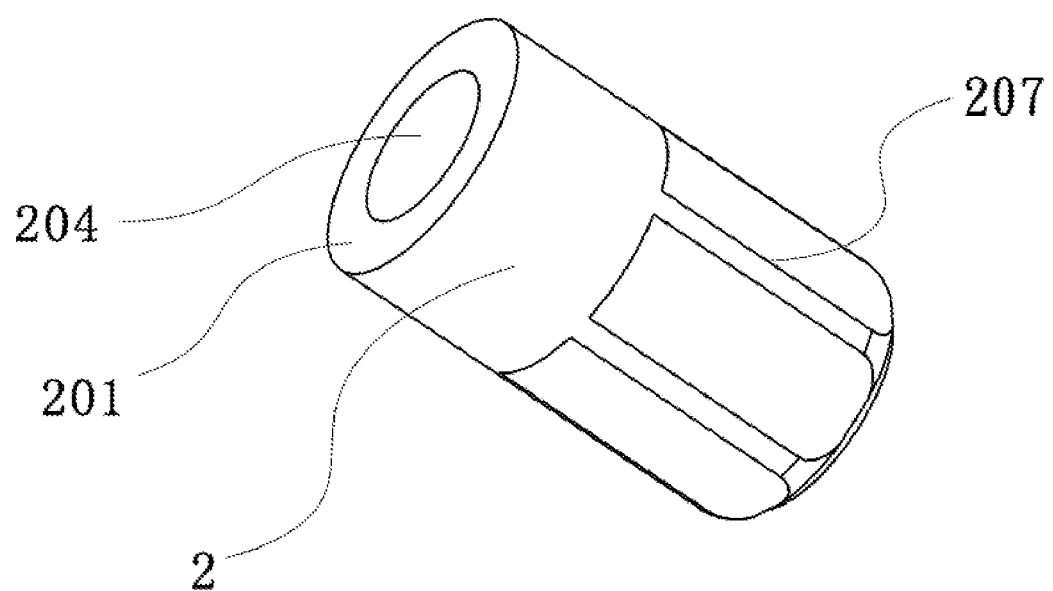
FIG. 2 is a perspective view of an iron plate ejector of the present invention.
Figure 3:
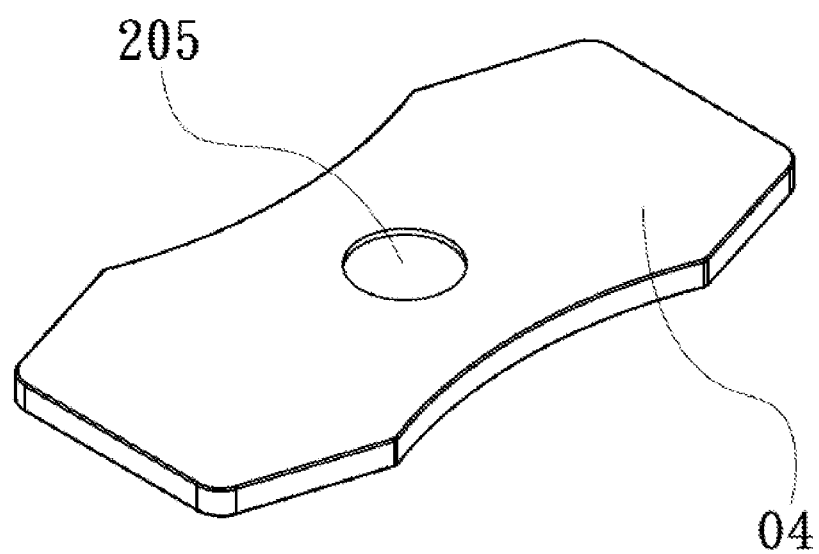
FIG. 3 is a perspective view of a second support iron plate in accordance with an embodiment of the present invention.

With reference to FIGS. 1 to 3 for a quick release device of a brake cylinder in accordance with the present invention, the quick release device of a brake cylinder comprises:

a first support iron plate 01;

a second support iron plate 04, installed with an interval from a side of the first support iron plate 01;

an iron plate ejector 02, installed between the first and second support iron plates 01, 04 for expanding the relative distance between the first and second support iron plates; 01, 04; wherein the iron plate ejector 02 of an embodiment of the present invention has a first end surface 201 and a second end surface 202, and a telescopic structure is installed between the first end surface 201 and the first support iron plate 01, and the second end surface 202 is detachably coupled to the second support iron plate 04; and the telescopic structure of an embodiment is comprised of a threaded hole structure 204 disposed on the first end surface 201 and a stud structure 101 disposed at a relative position of the first support iron plate 01 and the threaded hole structure 204;

a wrench assembly 03, sheathed on the iron plate ejector 02 in a quick release manner; wherein the wrench assembly 03 of an embodiment is in form of a ratchet wrench and has a wrench hole 301 and a reversing switch 302;

at least one quick release portion, installed at a relative position of the iron plate ejector 02 and the second support iron plate 04, so that the second support iron plate 04 is in a quick release status, or installed at a relative position of the iron plate ejector 02 and the first support iron plate 01, and this invention is not limited to such arrangement only.

In an exemplary embodiment of the present invention, the quick release portion is comprised of a magnetic steel 203 disposed at the second end surface 202 and a magnetic guide portion 205 disposed at a relative positon of the second support iron plate 04 and the magnetic steel 203 (as shown in FIG. 3).

Preferred embodiments and the using status in accordance with the present invention are described together with the illustrative FIGS. 1 to 3 as follows. The present invention discloses an iron plate ejector 02 having an anti-rotation surface structure 206. During use, the threaded hole structure 204 disposed at the first end surface 201 and the stud structure 101 disposed at the first support iron plate 01 are rotated to control the distance between the first support iron plate 01 and the iron plate ejector 02, so that a user simply turns the wrench assembly 03 up and down to control and change the distance between the first and second support iron plates 01, 04 easily. When it is inconvenient to turn the wrench assembly 03, the user can press the reversing switch 302, and turn the wrench assembly 03 downward first. Now, the wrench assembly 03 still can drive the iron plate ejector 02 to rotate the stud structure 101 out from the threaded hole structure 204. When the distance between the first and second support iron plates 01, 04 is increased, the stud structure 101 and the threaded hole structure 204 can jointly prevent a decreased distance between the two, so as to ensure the relative position effectively. Compared with the conventional brake cylinder that requires a direct hammering or a pulling of the threaded rod for the removal, the present invention has a simpler structure and requires less effort for the use. Wherein, the magnetic guide portion 205 is in form of a guide slot, and the magnetic steel 203 and the magnetic guide portion 205 are embedded with each other in a foolproof magnetic attraction manner, so that after use, the two can be magnetically combined, positioned or separated, or the first and second support iron plates 01, 04 can be released quickly to change a wrench assembly 03 of a different size. The present invention achieves the advantages of a quick release and a convenient use by the magnetic attraction method.

Figure 4:
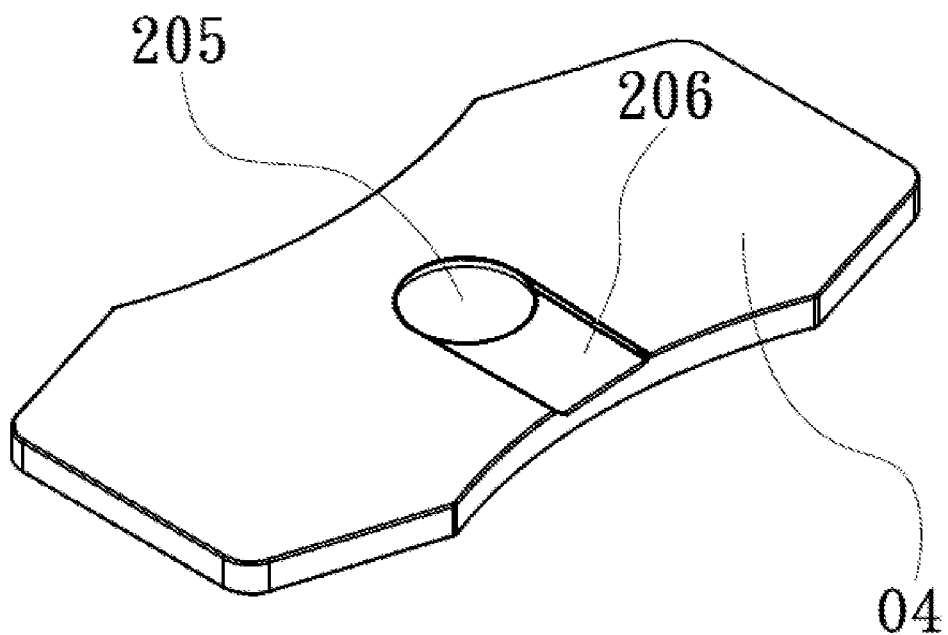
FIG. 4 is a perspective view of a second support iron plate in accordance with another embodiment of the present invention.

With an embodiment as shown in FIG. 4, a side of the magnetic guide portion 205 is communicated to the second support iron plate 04 to form a guide opening 206, and the guide opening 206 and the magnetic guide portion 205 have a height difference, so that the iron plate ejector 02 can slide into the guide opening 206 sideway and can be positioned at the magnetic guide portion 205, so as to improve the stability and the degree of positioning during the assembling process.

In summation, the present invention has the following advantageous effects:

(1) The quick release device has the advantages of simple structure, quick release, and effort-saving effect.

(2) The magnetic steel 203 on the second end surface 202 and the magnetic guide portion 204 of the second support iron plate 04 can fix or separate the second support iron plate 04 relative to the iron plate ejector 02 quickly.

(3) The threaded hole structure 204 of the telescopic structure and the stud structure 101 can be turned to stably and quickly adjust the distance between the first and second support iron plates 01, 04.

(4) The design of the reversing switch 302 allows the wrench assembly 03 to turn both ways, so as to provide a quicker and more convenient application.

What is claimed is:

1. A quick release device of a brake cylinder, comprising:
a first support iron plate;
a second support iron plate, installed with an interval from a side of the first support iron plate;
an iron plate ejector, installed between the first and second support iron plates, for expanding the relative distance between the first and second support iron plates;
a wrench assembly, sheathed on the iron plate ejector in a quick release status; and
at least one quick release portion, installed at a relative position of the iron plate ejector and the second support iron plate, so that the second support iron plate is in a quick release status, wherein the iron plate ejector has a first end surface and a second end surface, and the second end surface and the second support iron plate are detachably coupled to each other;
wherein the quick release portion is comprised of a magnetic steel installed at the second end surface and a magnetic guide portion installed at a relative position of the second support iron plate and the magnetic steel; wherein the magnetic guide portion is in form of a guide slot capable of embedding the magnetic steel and the magnetic guide portion with each other in a foolproof magnetic attraction manner;
wherein the magnetic guide portion has a side communicating with the second support iron plate to form a guide opening, and the guide opening and the magnetic guide portion have a height difference, so that the iron plate ejector can slide into the guide opening sideway and be positioned at the magnetic guide portion.

* * * * *